Patented Dec. 12, 1950

2,534,058

UNITED STATES PATENT OFFICE 2,534,058

POLYMERIZATION OF TETRAFLUOROETHYLENE WITH DIBASIC ACID PEROXIDE CATALYSTS

Malcolm MacKenzie Renfrew, Arlington, N. J., assignor to E. I. du Pont de Nemours & Company, Wilmington, Del., a corporation of Delaware No Drawing. Application November 30, 1946, Serial No. 713,385

10 Claims. (Cl. 260—29.6)

1

This invention relates to suspensoids of polytetrafluoroethylene and, more particularly, to a process of preparing such suspensoids directly from tetrafluoroethylene.

Heretofore several different methods of polymerizing tetrafluoroethylene have been proposed but the polymer, following these methods, is obtained in a granular form which is difficult to reduce to small enough particle size to give relatively stable suspensoids. There has been no practical method of preparing a relatively stable suspensoid of polytetrafluoroethylene heretofore.

An object of the present invention is to provide a process of preparing relatively stable aqueous suspensions of polytetrafluoroethylene. A further object is to provide such a process which is economical and relatively simple to carry out. Further objects will be apparent from the description of the invention given hereinafter.

The above objects are accomplished according to the present invention by contacting tetrafluoroethylene at a temperature of 0° C. to 95° C. and a pressure of 15 to 500 pounds per square inch with an aqueous solution of a saturated aliphatic dibasic peroxy compound while agitating said solution. Preferably, the reaction is carried out at a temperature of 55° C. to 70° C. and at a pressure of 50 to 350 pounds per square inch using an aqueous solution containing 0.1% to 0.4%, by weight of water, of disuccinic acid peroxide although the catalyst may be used quite successfully anywhere in the range of 0.05% to 0.50%, by weight of water.

A suitable procedure for carrying out the present invention consists in charging a pressure reactor with an aqueous solution of a saturated aliphatic dibasic peroxy compound, evacuating the reactor to remove the major portion of the atmospheric oxygen, and then charging with tetrafluoroethylene as a liquid or a gas under pressure. The reactor is charged to a pressure of 200 to 300 lbs. per sq. in. and is then moderately agitated and heated to a temperature of about 60° C. The polymerization reaction will be accompanied by a pressure drop and will proceed to produce a stable suspensoid. Excess tetrafluoroethylene is then removed from the reactor, leaving a suspensoid containing up to 8.5%, by weight of the suspensoid, of polytetrafluoroethylene.

The above procedure may be modified advantageously by the addition of more tetrafluoroethylene to maintain the reaction pressure as the reaction proceeds. This facilitates control of the reaction which proceeds rapidly and smoothly. The process of this invention may be also carried out continuously.

2

The product obtained in accordance with this invention is a suspensoid which is stable at room temperature for an appreciable length of time. For example, a suspensoid containing about 5% polytetrafluoroethylene, is stable for at least one week. Examination of these suspensoids has shown that they are lyophobic sols comprising negatively charged particles approximately 0.1 to 0.3 micron in diameter.

The following examples in which all parts are by weight unless otherwise specified, illustrate specific embodiments of the invention.

Example I

A stainless steel, rocker tube pressure reactor is charged with a solution containing 0.1 part of monosuccinic acid peroxide in 100 parts of distilled water, the charge occupying 65% of the reactor volume. The reactor is closed, evacuated, and charged with 12 parts of tetrafluoroethylene to a pressure of 350 lbs. per sq. in. The reactor is heated to 30° C. and agitated by rocking through an angle of 30° at the rate of 58 times per minute. As the reaction progresses, the pressure decreases and 5 parts of tetrafluoroethylene are fed into the reactor to maintain the pressure between 320 and 350 lbs. per sq. in. for three hours. The reactor is then cooled to room temperature and approximately 12 parts of tetrafluoroethylene are removed. There is obtained 104 parts of a suspensoid containing 4% polytetrafluoroethylene.

Example II

The rocker tube reactor of Example I is charged with a solution containing 0.1 part of disuccinic acid peroxide in 100 parts of distilled water. The reactor is closed, evacuated, and charged with 12 parts of tetrafluoroethylene to a pressure of 350 lbs. per sq. in. The reactor is heated to 55° C. and agitated. As the reaction proceeds, 8 parts of tetrafluoroethylene are fed into the reactor to maintain the pressure between 320 and 350 lbs. per sq. in. for 8 hours. The reactor is cooled to room temperature and approximately 12 parts of tetrafluoroethylene are removed. There is obtained 107 parts of suspensoid containing 6.5% polytetrafluoroethylene.

Example III

The rocker tube reactor of Example I is charged with a solution containing 0.25 part of disuccinic acid peroxide in 100 parts of distilled water. The reactor is closed, evacuated, and charged with 2 parts of tetrafluoroethylene to a pressure of 50 lbs. per sq. in. The reactor is heated to 90° C.

and agitated. As the reaction progresses, 5 parts of tetrafluoroethylene are fed into the reactor to maintain the pressure between 40 and 50 lbs. per sq. in. for three hours. The reactor is then cooled to room temperature and approximately 2 parts of tetrafluoroethylene are removed. There is obtained 104.5 parts of suspensoid containing 4.5% of polytetrafluoroethylene.

*Example IV*

A stainless steel autoclave of ½ gallon capacity and equipped with a propeller type agitator, is charged with a solution containing 0.1 part of diglutaric acid peroxide in 100 parts of distilled water, the charge occupying 65% of the autoclave volume. The autoclave is closed, evacuated, and charged with 10 parts of tetrafluoroethylene to 300 lbs. per sq. in. pressure. The autoclave is heated to 65° C. and the contents stirred by the agitator running at 300 R. P. M. Five parts of tetrafluoroethylene are fed intermittently to maintain the pressure in the range of 280 to 300 lbs. per sq. in. After two and one-half hours the autoclave is cooled to room temperature and the excess tetrafluoroethylene removed. There is obtained 103 parts of suspensoid containing 3% of polytetrafluoroethylene.

It will be understood that the above examples are merely illustrative and that the present invention broadly comprises contacting tetrafluoroethylene at a temperature within the range of 0° C. to 95° C. and a pressure within the range of 15 to 500 lbs. per sq. in. with an aqueous solution of a saturated aliphatic dibasic peroxy compound while agitating said solution.

To avoid introducing contaminating agents or substances that might possibly adversely affect the stability of the suspensoid to be formed, it is preferred to use distilled water as the aqueous medium in the process but this is by no means a necessity. As those skilled in the art will appreciate, various known dispersion agents, buffering salts, and the like may be added to the water to some advantage in specific instances although, as a general rule, it has been found that the reaction proceeds more satisfactorily without such additions.

The catalyst employed is a highly critical factor in the present invention since the formation of a satisfactory stable suspensoid apparently is dependent on the selection of the catalyst from a particular small class of compounds. This class of compounds consists of the water soluble saturated aliphatic dibasic peroxy compounds, especially suitable specific compounds being monosuccinic acid peroxide, disuccinic acid peroxide, and diglutaric acid peroxide. The proportion of catalyst used can be varied to a considerable extent but will ordinarily be employed in the range of 0.05% to 0.50% by weight of the water and, preferably, in the range of 0.1% to 0.4%.

Suitable proportions of tetrafluoroethylene to water have been illustrated in the examples. The process is most effective when a proportion of 1 part of tetrafluoroethylene to 4 to 100 parts of water is employed and, as a practical matter, there would be no particular advantage in operating outside these limits.

It is preferred to carry out the reaction at a temperature of 55° C. to 70° C. and under a pressure of 50 to 350 lbs. per sq. in. as stated before. Despite this, the reaction may be carried out at temperatures as low as 0° C. and on up to 95° C. or so. The reaction must be carried out at least at atmospheric pressure and stable suspensoids are formed under pressures running up to 500 lbs. per sq. in. although little is to be gained from exceeding a pressure of 350 lbs. per sq. in. under normal operating conditions. It is preferred to carry out the reaction in a reactor which has been evacuated before the addition of tetrafluoroethylene, and, in some cases, it may be desirable to sweep the reactor with nitrogen before the addition of tetrafluoroethylene.

The process of this invention may not only be carried out batch-wise as illustrated in the examples but also in a continuous manner, for example, by passing a mixture, in the proper proportions, of tetrafluoroethylene and water containing the catalyst, through a zone which is under polymerization conditions. In operating the process in this manner the unreacted tetrafluoroethylene is recycled and the suspensoid is separated. Continuous operation has several advantages such as the readiness with which unreacted monomer may be reused, the accurate control over the reaction conditions, increased operating economy, and flexibility of operation.

The formation of stable suspensoids according to the present invention is favored by moderate agitation of the aqueous medium. However, it has been found that too violent agitation is of no advantage and under some circumstances actually tends to prevent the formation of a suspensoid.

The most satisfactory reaction vessels for carrying out the present process are those constructed of a corrosition resistant material so that contamination of the polymer with metals or metal salts may be avoided. It is satisfactory to operate in apparatus constructed of or lined with such materials as stainless steel, nickel, tantalum, and Hastelloy. Vitreous liners, such as glass and porcelain, may also be employed.

The stable suspensoids containing polytetrafluoroethylene of the present invention find a large number of valuable applications. These suspensoids are of particular value for depositing films which will withstand corrosive attack and elevated temperatures and which possess excellent electrical properties. They can be used to produce very thin films for electrical insulation such as that used in the fabrication of capacitors; to coat wire for resistors, coils for motors, transformers, relays, reactors, and similar devices; to impregnate fabrics to improve corrosion resistance; to decrease water absorption, and for use in manufacture of motors, such as wire wrappings, slot liners, commutator insulation, and the like. Containers and vessels may be lined with polytetrafluoroethylene obtained from these suspensoids in order to provide vessels with a complete inert lining.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing a suspensoid of polytetrafluoroethylene which comprises contacting tetrafluoroethylene at a temperature of 0° C. to 95° C. under a pressure of at least 15 lbs. per sq. in. with an aqueous solution of a peroxide of a saturated aliphatic dibasic acid having 4 to 5 carbon atoms, inclusive.

2. Process of preparing a suspensoid of polytetrafluoroethylene which comprises contacting tetrafluoroethylene at a temperature of 0° C. to 95° C. under a pressure of at least 15 lbs. per sq. in. with an aqueous solution of a peroxide of a saturated aliphatic dibasic acid having 4 to 5 carbon atoms, inclusive in a ratio of 1 part of tetrafluoroethylene to 4 to 100 parts of aqueous solution.

3. Process of preparing a suspensoid of polytetrafluoroethylene which comprises contacting tetrafluoroethylene at a temperature of 0° C. to 95° C. under a pressure of at least 15 lbs. per sq. in. with an aqueous solution containing 0.05% to 0.50%, by weight of water, of a peroxide of a saturated aliphatic dibasic acid having 4 to 5 carbon atoms, inclusive.

4. Process of preparing a suspensoid of polytetrafluoroethylene which comprises contacting tetrafluoroethylene at a temperature of 55° C. to 70° C. under a pressure of 50 to 350 lbs. per sq. in. with an aqueous solution of a peroxide of a saturated aliphatic dibasic acid having 4 to 5 carbon atoms, inclusive.

5. Process of preparing a suspensoid of polytetrafluoroethylene which comprises contacting tetrafluoroethylene at a temperature of 55° C. to 70° C. under a pressure of 50 to 350 lbs. per sq. in. with an aqueous solution of a peroxide of a saturated aliphatic dibasic acid having 4 to 5 carbon atoms, inclusive in a ratio of 1 part of tetrafluoroethylene to 4 to 100 parts of aqueous solution.

6. Process of preparing a suspensoid of polytetrafluoroethylene which comprises contacting tetrafluoroethylene at a temperature of 0° C. to 95° C. under a pressure of at least 15 lbs. per sq. in. with an aqueous solution of discuccinic acid peroxide.

7. Process of preparing a suspensoid of polytetrafluoroethylene which comprises contacting tetrafluoroethylene at a temperature of 0° C. to 95° C. under a pressure of at least 15 lbs. per sq. in. with an aqueous solution containing 0.05% to 0.50%, by weight of water, of disuccinic acid peroxide.

8. Process of preparing a suspensoid of polytetrafluoroethylene which comprises contacting tetrafluoroethylene at a temperature of 55° C. to 70° C. under a pressure of 50 to 350 lbs. per sq. in. with an aqueous solution containing 0.05% to 0.50%, by weight of water, of disuccinic acid peroxide, in a ratio of 1 part of tetrafluoroethylene to 4 to 100 parts of aqueous solution.

9. Process of preparing a suspensoid of polytetrafluoroethylene which comprises contacting tetrafluoroethylene at a temperature of 0° C. to 95° C. under a pressure of at least 15 lbs. per sq. in. with an aqueous solution of monosuccinic acid peroxide.

10. Process of preparing a suspensoid of polytetrafluoroethylene which comprises contacting tetrafluoroethylene at a temperature of 0° C. to 95° C. under a pressure of at least 15 lbs. per sq. in. with an aqueous solution of diglutaric acid proxide.

MALCOLM MacKENZIE RENFREW.

REFERENCES CITED

The following references are of record in the file of this patent:

UNITED STATES PATENTS

| Number | Name | Date |
|---|---|---|
| 2,319,576 | Agens | May 18, 1943 |
| 2,394,243 | Joyce | Feb. 5, 1946 |

OTHER REFERENCES

Milas et al.: J. Am. Chem. Soc., 68 642 and 3 (April 1046).